United States Patent Office 3,579,299
Patented May 18, 1971

3,579,299
POROUS SILICATE
Robert H. Sams, Aldan, and Newton W. McCready, Newtown Square, Pa., assignors to Philadelphia Quartz Company, Philadelphia, Pa.
No Drawing. Continuation-in-part of application Ser. No. 540,204, Apr. 5, 1966. This application July 30, 1968, Ser. No. 748,644
Int. Cl. C01b 33/00; C11d 3/04
U.S. Cl. 23—110A
6 Claims

ABSTRACT OF THE DISCLOSURE

A low bulk density, crystallized, alkaline sodium silicate or a detergent containing a low bulk density, crystallized, alkaline sodium silicate is formed by the addition of powdered silicon metal to a crystallizing mass of the alkaline sodium silicate to produce a forameniferous product of uniform porosity.

This is a continuation-in-part of U.S. application Ser. No. 540,204 filed Apr. 5, 1966 now Patent 3,466,221 issued on Sept. 9, 1969.

GENERAL BACKGROUND

The crystallized alkaline sodium silicates such as hydrated sodium sesquisilicates and sodium metasilicates are widely used as detergents or in compounding detergents. In many such applications, a low bulk density product is desired to prevent segregation in the final mix and to give the mix more bulk. Low bulk density products also may have more rapid solution rates and may give increased absorption of surfactants, for instance.

Crystallized sodium silicates of low bulk density have been made by beating air into the crystallizing mass, sometimes with the addition of surface active agents. In such processes, it is difficult to produce and maintain a uniform foam structure from the time the viscosity is low enough to permit foam until the mass finally crystallizes and sets.

Heating a liquor rapidly so as to produce steam and thus form pores in the mass has also been used to form lightweight crystallized sodium solicates. In this process the crystalline hydrates are not formed unless the boiling temperature is below the crystalline melting point or unless the liquor is cooled rapidly to below the melting point. Again, it is difficult to maintain the foam structure after the foaming step at low viscosity until the mass sets. Unless composition and conditions are carefully controlled, an anhydrous material or a mixture of anhydrous with non-crystalline or crystalline hydrates will result from water loss during steaming.

Lightweight insulation formed by the reaction of powdered Si metal and soluble silicates has relied on additives such as asbestos to provide the needed structural strength.

In all of these previous processes, control of bubble size and bubble uniformity is difficult.

SILICON PROCESS AND ITS PRODUCTS

In our silicon process, we have use dthe reaction of silicon with water in the presence of alkaline sodium silicate to produce hydrogen and form numerous bubbles throughout the crystallizing mass.

Whereas, the basic silicon reaction is simple, control of the process is not as simple as it would appear. In order to produce a desirable product of low bulk density in this manner it is essential to balance the viscosity, state of crystallization, and heat removal in the final stages of crystallization to avoid either "coffin" formation or a complete collapse of the structure. It is also necessary to control the silicon metal powder size and its dispersion in the mix as well as the preceding variables to get the desired small bubbles of uniform size and thin wall thickness. Once these variables are set for a given system, uniform product can be made consistently. ("Coffin" formation is the term used in the soap industry for large lacunae in soap poured into frames or molds and left to solidify prior to cutting into bars.)

Tablets, cakes, or granulated particles of lightweight expanded silicate may be prepared by this process in any size required for commercial applications such as for laundering, dishwashing, and metal cleaning. As tablets or cakes, the products are crystalline with small, uniform pores from the top to bottom and with little or no skin formation. As granular products, the particles have a spiny, irregular structure. The tablets and cakes are essentially dust-free and, surprisingly, when cakes are ground to prepare granular product, significantly less dust is produced than when the usual non-porous material is ground. One would expect such lightweight puffed material with relatively thin films between bubbles would develop more dust when crushed or ground. An advantage of our silicon process for manufacturing such products as detergents is that no substantial impurity is introduced and if the proper balance of NaOH, silica, water, and silicon is provided, the final product will have substantially the exact ratio of the desired crystalline product. Other detergent ingredients may be added to the slurry or mother liquor before expansion by the reaction of the silicon if desired. The products may also be colored, if desired.

The foamed cakes would be expected to dissolve more rapidly because of their greater surface area compared with a solid cake. The irregular shape of the granules also should reduce caking tendency because of the fewer particle-to-particle contacts.

We have found in general that the amount of seed that is added to the mother liquor should be controlled. The amount of seed is a factor that determines rate of crystallization and density. 0–30% seed can be used but we prefer 0.2–20%. Excessive amounts of seed will give a product of higher density because of the high bulk density of the finely sized seed and because of bubble puncture.

Crystallization can be allowed to advance as far as practicable before silicon addition. If crystallization advances too far, the mix becomes too stiff for silicon dispersion and to pour into forms.

We may use from about 0.01 to 0.4% silicon powder but we prefer to use 0.02–0.15%. The amount depends on the product desired and on the temperatures, atmospheric pressure, mixing equipment, and on the amount of seed used. Too small an amount of silicon powder will not produce enough bubbles and give high density. Too much silicon powder will cause an excessive amount of expansion and bubble coalescence resulting in large pores, thick walls and possibly even collapse of the expanded mass.

The more pure the silicon, the more pure will be the expanded product. An alloy with 95% silicon is satisfactory and will not add significant amounts of impurities. Lower purity silicon alloys can be used if purity and possible insoluble formation are not critical in the final product. Compensation for active silicon should be made when low silicon content alloys are used. The silicon metal powder should be finely divided to produce a maximum number of small bubbles. We prefer smaller particles, less than 150 mesh (Tyler).

Temperatures during crystallization, silicon addition, and pouring will vary with the amount of seed, amount of silicon metal, type of equipment, and whether hydrated sodium meta-silicates, sesquisilicates or other crystalline products or mixtures are to be made. In all cases, the temperatures should be below the melting point but high enough to allow the desired crystalline specie to form. Seeding of the mother liquor should take place at a temperature below the melting point of the crystalline hydrate.

For example, with sodium metasilicate pentahydrate, whose crystalline melting point is 72.2° C., it is desirable to have the batch temperature about 52° C. before addition of the silicon powder. This lower temperature slows the reaction rate of the silicon powder and increases the viscosity of the liquor so that the bubbles do not tend to coalesce. However, with proper adjustment of seed, silicon metal powder, and degree of crystallization, temperatures of about 65° C. can be tolerated. We prefer to maintain the batch during crystallization and silicon powder addition in the range of 49–55° C. and the temperature in the pan after pouring below 63° C. Actually we would prefer to maintain this temperature below about 57° C. for best results.

Similar considerations have to be made when expanding sodium sesquisilicate hydrates, other sodium metasilicate hydrates, or detergent mixtures.

When the product is to be granulated, the preferred depth of pour into the pan is 3″–9″. Deeper layers gave either "coffins" or layers of unfoamed silicate especially when the temperature was high during crystallization. The optimum depth will vary with the initial temperature of pour, extent of crystallization, and heat transfer from the pan.

Naturally, the batch may also be poured into smaller molds forming porous bricks loaves, tablets or the like.

Expansion of the mass takes place in both the mixer and the pan. Volume rise will depend on desired density. Normally, we would expect a 300–500% expansion for a desirable product.

Bulk density of the granulated product will depend on the initial product as well as the product size range and conditions as given above. Bulk densities, for example, of −10+28 mesh (Tyler) fraction of sodium metasilicate pentahydrate prepared according to this process can range from 25–45 lbs./cu. ft. untamped and 30–50 lbs./cu. ft. tamped. The procedure for measuring the bulk density is given in the examples.

The granulated products of our invention are stronger than spray dried detergents and so have less tendency to break down into fines—resulting in retention of good contrast. Because of their low bulk density and irregular shape, these particles of our invention do not segregate when mixed with the white detergent.

LOW BULK DENSITY SILICATE BY AGGLOMERATION

Agglomeration of hydrated sodium metasilicate fines is not new in the art but generally has been practiced to upgrade fines and form high bulk density products. For example, such agglomeration has been carried out by agitating the fines while in contact with hot concentrated liquor of the same composition as the crystalline fines or by heating the fines externally while mixing to cause aggregation as the melting point of the crystalline fines is reached. Both of these methods have definite drawbacks. They both tend to give high bulk density products. The liquor agglomerating process also requires special equipment and carries the inherent difficulties of handling a hot viscous mother liquor in a bed of fines. The heat agglomeration method with external heating appears simple but density is hard to control and melted product tends to stick to the hot exterior walls reducing heat transfer and in extreme cases forming one big lump in the apparatus.

We have found a simpler, more efficient way to agglomerate hydrated sodium metasilicate as low bulk density products. In our process a rotating drum containing a bed of fines is used with a means of heating only the surface of the particles in the center of the batch. We prefer to use a centrally located source of infra-red heat such as an electrical resistance heater or a gas-fired radiator. The surface melted particles act as binders to the unmelted particles and do not touch the sides of the drum. There is practically no loss of heat transfer and there is no build-up on the drum walls. The heat can be controlled and a very satisfactory agglomerate is produced of any desired bulk density between 20 and 50 lbs./cu. ft. The final density may be varied by the temperature and time of heating. A simple derivative process is to heat the surface of a pan of fines until melting occurs and then agitate the mass to form an agglomerate.

We found that it is desirable to control the screen size of the feed to obtain the lowest densities. However, if intermediate or higher densities are desired, the screen size of the feed is not as critical. The agglomerates can be colored by simple addition of dry pigments to give a strongly adhering coating that will not rub off.

This invention contemplates the production of granular pentahydrate sodium metasilicate having a tamped bulk density between 20 and 50 pounds per cubic foot in the screen size range of minus 10 to plus 48 mesh.

EXAMPLE 1

Porous bricks of sodium metasilicate pentahydrate to be used as a detergent were prepared from a melt having the composition of pentahydrate sodium metasilicate at 75° C. (167° F.). This was cooled to 65° C. (149° F.) and 0.2% of crushed finely divided pentahydrate sodium metasilicate was mixed in as seed. Then 0.1% of silicon powder of 300–400 mesh (Electro-Metallurgical Co. 99% purity) was added and mixed in. The total composition was poured into a rectangular mold about 2 x 4 in. in a shallow layer about 0.5 in. deep and allowed to crystallize and cool. The mass rose like bread dough to a thickness of about 1.5 in. and changed from grey to white within an hour. In 2 hours the brick was rigid and after storing for about 72 hours the mold was removed. The block had a density of 0.62 g./cc. (39 lbs./ft.$^3$) compared to 1.75 g./cc. (109 lbs./ft.$^3$) for solid pentahydrate sodium m6etasilicate prepared without the silicon.

The composition was approximately 29.5% $Na_2O$, 28.7% $SiO_2$, 41.7% $H_2O$, and a weight percent ratio of 0.985 $Na_2O$:1 $SiO_2$:4.85 $H_2O$.

EXAMPLE 2

A liquor having a composition of sodium sesquisilicate pentahydrate was prepared and adjusted by the addition of 0.42% NaOH and 0.39% water. The batch was heated to 90° C. (194° F.) to melt any crystal phase and then cooled to 80° C. (176° F.). Additional water was added to offset the evaporation, and 0.1% of the silicon powder of Example 1 was stirred in and portions were poured into the molds of Example 1. The expanded product had uniform, fine pores and the composition of approximately 36.7% $Na_2O$, 24.2% $SiO_2$ and 38.1% $H_2O$ or as expressed as a weight percent mol ratio 2.9:2.10:10.50.

EXAMPLE 3

A porous penthydrate sodium metasilicate was prepared by melting 100 parts by weight of commercial pentahydrate sodium metasilicate (Metso Granular from the Philadelphia Quartz Co.), adding 0.28 parts by weight NaOH and 0.37 parts by weight of water. This mixture was brought to 75° C. (167° F.) and then recooled to 65° C. (149° F.) and sufficient water was added to offset any evaporation. Following this, 0.2 parts by weight of very fine sodium metasilicate pentahydrate was added as seed and 0.1 part by weight of −200 mesh silicon powder, such as is obtained from the Hummel Chemical Co. or Ohio Ferro-Alloys Corp. and described as "−250 mesh and down" with a purity of about 96% Si.

The mixture was rapidly stirred until the viscous liquor was uniformly grey. It was then poured as a shallow layer into insulated Teflon polytetrafluoroethylene lined molds having a diameter of about 4 inches. The product expended to about 4 times its original depth, became white and solidified within an hour. The mass was allowed to cool over night and was then cut into fragments of about 0.125 to 0.25 inch. These were then forced through a 6 mesh screen (Tyler). This produced 29% of material between 6 and 10 mesh, 30% between 10 and 20, and 34% between 20 and 65 mesh but only 7% of −65 mesh material. (All meshes are Tyler Standard Screen Sizes.) The 6–10 mesh sample had a tamped bulk density of 24 lbs./ft.³, 10–20 mesh was 28 lbs./ft.³, and the 20–65 mesh fraction had a bulk density of 34.5 lbs./ft.³. Tamped bulk densities were determined by pouring the granules into a graduate and rapping its bottom on a resilient pad (such as a note pad) 25 times or until no further compaction occurred. The net weight of the granules and their tamped volume was determined and bulk density calculated.

The product, approximately the composition of pentahydrate sodium metasilicate, dissolved readily in water without formation of insoluble matter.

In further experiments of this type, we determined that using more than about 0.15% silicon, or less than 0.067% silicon, resulted in 10 to 20 mesh granules which were more dense than the product using 0.1% silicon. Furthermore, seeding with excessive amounts of fine pentahydrate metasilicate resulted in a denser product. For instance, with 30% of fine seed the density was about 40 lbs./ft.³ compared to 32 lbs./ft.³ when only 0.2% of seed was used. All of these densities are tamped densities of the 10 to 20 mesh product. For comparison, a regular 10 to 20 mesh pentahydrate sodium metasilicate not foamed had a density of 57 lbs./ft.³.

When larger size batches were used, it was found preferable to cool the seeded liquor to about 55° C. (132° F.) rather than 65° C. (149° F.) before adding the silicon powder. Otherwise the heat of crystallization permitted the rise and coalescence of the gas cells into larger bubbles before sufficient rigidity developed to resist further change.

When a mother liquor concentrated to the pentahydrate metasilicate concentration was used instead of a melted liquor from a previously crystallized pentahydrate, a somewhat longer time was needed for the mass to solidify. Controlled cooling of the poured batch was very beneficial in maintaining finely dispersed cells. Yields in the 10–20 mesh fraction were about 50% of the product obtained by jaw crushing the cake. Tamped densities varied from 30–32 lbs./cu. ft.

EXAMPLE 4

Larger scale experiments were run by which products having an untamped bulk density of 31 lbs. per cu. ft. were obtained compared with 52 lbs. per cu. ft. for regular production of ground crystallized cake.

1000 lbs. of a mother liquor having about the composition of pentahydrate sodium metasilicate was run into a crystallizer and was agitated while being cooled to below about 125° F. (52° C.). The crystallizer was cooled with water. Then 15 lbs. (1.5%) of sodium metasilicate pentahydrate fines was added as seed and mixed until the mix turned creamy and the seed was thoroughly dispersed. This took about 5 minutes. Then 1 lb. (0.1%) of silicon metal powder (about 96% Si and 250 mesh and down) from Ohio Ferro-Alloys Corp., was sifted into the agitated mixture. The mixture began to rise in about 1 to 2 minutes without any noticeable increase in temperature. Five minutes after addition, the first pan was poured. A depth of 9 inches was preferred since deeper layers tended to develop a "coffin" and higher bulk densities. The crystallizer was discharged completely in about 1.5 minutes.

The pans were stacked to crystallize and cool in the air at ambient temperatures. The maximum temperature reached in the pans was 145° F. (63° C.) in about 30 minutes. A good product was indicated by the formation of small bubbles in the top and the complete reaction of te silicon metal as shown by absence of black spots. The cakes were still slightly warm after 24 hours and could be ground within 2 or 3 days. The cakes broke up easily in the crusher with less dusting than in normal production of unleavened pentahydrate sodium metasilicate.

A series of runs were made, as shown in the following table:

| Run | Percent Silicon (on liquor) | Percent Seed (on liquor) | Batch size (lbs.) | Temp., ° F. | Temp. in pan | Cake condition |
|---|---|---|---|---|---|---|
| A | 0.08 | 1.5 | 800 | 125 | 140 | Good. |
| B 1 | 0.1 | 1.5 | 1,000 | 125 | 140–145 | Do. |
| B 2 | 0.1 | 1.5 | 1,000 | 121 | 140 | Do. |
| C 1 | 0.14 | 1.5 | 1,000 | 125 | 145 | Do. |
| C 2 | 0.125 | 1.5 | 1,000 | 125 |  | Do. |
| D 1 | 0.1 | 30 | 1,300 | 125 | 145 | Fair. |
| D 2 | 0.1 | 30 | 1,300 | 135 | 145 | Poor.[1] |
| E | 0.1 | 1.5 | 1,000 | 135 | 135–137 | Do.[2] |

[1] "Coffin" and hard layers.
[2] "Coffins" and hard layers.

In run D 2 the mixing was continued for 22 minutes instead of 4 to 5 minutes, and in run B 2 the pan depth was 12 inches.

The screen distribution of the overall product of run A was about as follows:

Tyler mesh screen size:                           Percent
 +10 _____ 0.1
 −10+28 _____ 20.1
 −28+48 _____ 32.2
 −48+65 _____ 12.0
 −65+100 _____ 9.4
 −100+200 _____ 13.1
 −200 _____ 8.1, loss 5.0

Forty-seven percent was collected in the product hopper and this had a particle size of 39% −10+28, 49% −28+48, 10% −48+65, and 3% −65+100.

The bulk density of the product of Run A was 40 lbs. per cu. ft. untamped and 50 lbs. per cu. ft. tamped as obtained in the product hopper. The −10+28 range product untamped was 34 lbs. per cu. ft. and 41 lbs. per cu. ft. tamped. With Run B the −10+28 fraction had an untamped density of 32 lbs. per cu. ft. and a tamped bulk density of 40 lbs. per cu. ft. With Run C, using 30% seed, the −10+28 mesh fraction had an untamped density of 42 and a tamped density of 51.

Untamped bulk densities were determined by pouring the granules into a graduate held at an angle and carefully measuring the volume and weight.

It would be expected that if the minimum temperature for good mixing, that is about 110° F. (43° C.) were used a product of a lower bulk density would be obtained even at a higher seed content. Cake temperature should be maintained below about 125° F. (52° C.) by more efficient cooling of the pans.

EXAMPLE 5

Another series of large scale experiments were made on equipment similar to Example 4 but without the cooling capacity. In this location, the atmospheric pressure was 580 mm. and expansion was therefore more rapid. This example shows how the amounts of seed and silicon can be used to overcome adverse temperature and pressure control.

Five hundred kilos of liquor of pentahydrate sodium metasilicate concentration was drawn into the crystallizer. The liquor was cooled to 56° C. Seed was not added because liquor contained seed and the mass was far advanced in crystallization. 500 grams (0.1%) of the same silicon powder used in Example 4 was stirred in and pans poured to an initial depth of 9″. The material puffed and completely filled the pans. Temperature in the pans exceeded 70° C. within 10 minutes. The cakes were caved in by the next morning. Samples of the uncaved cake were ground in the laboratory and found to have bulk densities of 25 and 29 lbs./cu. ft. untamped and tamped respectively in the −10+20 mesh fraction.

Similar runs were made with 0.075% silicon powder with 1.5% seed, these expanded but temperature could not be controlled and cakes formed were poor. Several more runs were made with increasing amounts of seed and decreasing amounts of silicon powder as shown in the following table. In this test, lesser amounts of Si powder could be used because of the low atmospheric pressure.

| Run | Percent Seed | Percent Silicon | Temp., °C. | Pan temp., degrees | Results |
|---|---|---|---|---|---|
| A | 1.5 | 0.75 | 47 | 72 | Dense cake, melted in middle. |
| B | 1.5 | 0.075 | 61 | | Bubbles, large. |
| C | 1.5 | 0.1 | 59 | | Bubbles, large, melted. |
| D | 3.0 | 0.062 | 62 | | Bubbles, big, fair. |
| E | 0.1 | 0.075 | 61 | 71 | Large bubbles. |
| F | 3 | 0.062 | 64 | 72 | Large bubbles, cake fair. |
| G | 3 | 0.045 | 64 | 72 | Do. |
| H | 10 | 0.045 | 62 | 71 | Bubbles, fair. Dense layer in middle. |
| J | 25 | 0.045 | 61 | 67 | Bubbles, fair, not crystallized in middle. |
| L | 15 | 0.04 | 62 | 70 | Very good, 6″, large bubbles 9″. |
| M | 15 | 0.045 | 63 | | Large pores. |
| N | 20 | 0.045 | 60 | | Do. |

PRODUCT BULK DENSITY

−10+20 mesh lbs./ 1 ft.³

| | Untamped | Tamped | Percent Seed | Percent Silicon |
|---|---|---|---|---|
| B | 33 | 37 | 1.5 | 0.075 |
| J | 35 | 39 | 25 | 0.045 |
| H | 36 | 41 | 10 | 0.045 |
| L | 31, 32 | | 15 | 0.04 |
| N | 37 | | 20 | .045 |
| Example 5 | 31 | 39 | | |

The best run was with 500 kilos of liquor, 75 kilos of seed (15%), and 200 g. silicon powder (.04%). Seed was added at 64° C. and silicon powder sifted in 10 minutes later. Despite a temperature rise to 70° in the pan, the cake was viscous enough to retain its structure. It was necessary to pour the cake to a 6″ depth to obtain best results, pouring to 9″ gave larger bubbles than desired. A ground powder from this 6″ cake in a −10+20 fraction gave a 31 lbs./ft³. untamped bulk density, similar to previous commercial runs where less seed, more silicon, and lower temperatures were used. One hundred more cakes were poured using this procedure and only 3 pans had bubbles too large causing rejections. These cakes when ground gave a bulk density untamped of 31 lbs./ft.³ and a 40% yield in the −10+28 mesh range.

More or less specific claims will be presented hereinafter and even though such claims are rather specific in nature, those skilled in the art to which this invention pertains will recognize that there are obvious equivalents for the specific materials recited therein. Some of these obvious equivalents are disclosed herein and other obvious equivalents will immediately occur to one skilled in the art and still other obvious equivalents could be readily ascertained upon rather simple routine noninventive experimentation. Certainly no invention would be involved in substituting one or more of such obvious equivalents for the materials specifically recited in the claims. We intend that all such obvious equivalents be encompased within the scope of this invention and patent grant in accordance with the well known doctrine of equivalents as well as changed proportions of the ingredients which do not render the composition unsuitable for the disclosed purposes.

What we claim is:
1. The expanded porous hydrated reaction product of
   (a) a sodium silicate hydrate selected from the group consisting of the hydrates of sodium metasilicate and sodium sesquisilicate, and
   (b) silicon powder in an amount between 0.01 and 0.4% by weight based on the weight of the sodium silicate hydrate,
said expanded porous reaction product
   (1) being crystallized,
   (2) being rapidly soluble, and
   (3) being 300–500% the volume of the same quantity of said sodium silicate hydrate which has been crystallized in the absence of silicon powder.

2. An expanded granular pentahydrate sodium sesquisilicate reaction product in accordance with claim 1 wherein the tamped bulk density is between about 20 and 60 lbs./ft.³ in the screen size range of minus 10 to plus 48 mesh.

3. The product of claim 1 as a pentahydrate sodium metasilicate in a cast shape with a density between about 20 and 100 lbs. 1 ft.³.

4. The product of claim 1 as a sodium sesquisilicate in a cast shape with a density between about 20 and 100 lbs. 1 ft.³.

5. The expanded porous hydrated reaction product of claim 1 as a pentahydrate sodium metasilicate having a tamped bulk density between about 20 and 50 pounds per cubic foot in the screen size range of minus 10 to plus 48 mesh.

6. The process of manufacturing the product of claim 1 comprising:
   (a) providing a mother liquor of a sodium silicate hydrate selected from the group consisting of the hydrates of sodium metasilicate and sodium sesquisilicate,
   (b) seeding said mother liquor at a temperature below the melting point of the sodium silicate hydrate with from 0 to 30% of fine particles of said hydrate thereby hastening the crystallization of the mother liquor,
   (c) dispersing from about 0.01 to 0.4% of silicon powder in the seeded mother liquor,
   (d) pouring said partially crystallized and seeded dispersion into crystallizing molds,
   (e) allowing the material to crystallize.

References Cited

UNITED STATES PATENTS 2,860,034  11/1958  Mockrin _____ 252—135

FOREIGN PATENTS 1,045,682  10/1966  Great Britain _____ 23—110.1

OSCAR R. VERTIZ, Primary Examiner

H. S. MILLER, Assistant Examiner

U.S. Cl. X.R.

252—135